United States Patent
van Arendonk et al.

(10) Patent No.: US 9,658,342 B2
(45) Date of Patent: May 23, 2017

(54) X OR GAMMA RAY INDIRECT IMAGE DETECTOR WITH FIBER OPTIC PLATE (FOP) STAND-OFFS AND METHOD OF ASSEMBLY

(71) Applicant: Teledyne DALSA, Inc., Waterloo, Ontario (CA)

(72) Inventors: Anton Petrus Maria van Arendonk, Waterloo (CA); Adalbert Hegedus, Waterloo (CA)

(73) Assignee: Teledyne Dalsa, Inc., Waterloo, Ontario (CA)

( * ) Notice: Subject to any disclaimer, the term of this patent is extended or adjusted under 35 U.S.C. 154(b) by 75 days.

(21) Appl. No.: 14/629,104

(22) Filed: Feb. 23, 2015

(65) Prior Publication Data

US 2016/0245930 A1   Aug. 25, 2016

(51) Int. Cl.
*G01T 1/20*   (2006.01)
*G01T 1/24*   (2006.01)

(52) U.S. Cl.
CPC .......... *G01T 1/2018* (2013.01); *G01T 1/2002* (2013.01); *G01T 1/24* (2013.01)

(58) Field of Classification Search
CPC ........ G01T 1/2002; G01T 1/24; G01T 1/2018
See application file for complete search history.

(56) References Cited

U.S. PATENT DOCUMENTS

| | | | |
|---|---|---|---|
| 4,255,666 A | 3/1981 | Wang et al. | |
| 4,778,565 A | 10/1988 | Enck et al. | |
| 4,874,378 A * | 10/1989 | Hillstead | A61M 25/0662 604/264 |
| 2003/0164453 A1* | 9/2003 | Nakata | C03B 37/028 250/370.09 |
| 2009/0020705 A1 | 1/2009 | Pandelisev | |
| 2010/0208872 A1 | 8/2010 | Karellas | |
| 2012/0228512 A1* | 9/2012 | van Arendonk | G01T 1/2018 250/368 |

OTHER PUBLICATIONS

Zhao et al., "X-ray imaging performance of structured cesium iodide scintillators," Med. Phys. vol. 31 No. 9 Sep. 2004, pp. 2595-2605.
Thilo Horvatitsch., "Smart Fiber Optics for Use in Modern Radiology," Schott Solutions Feb. 2013, Digital X-Ray Systems Digitale Röntgensysteme.
Hamamatsu, Fiber Optic Plate with X-Ray Scintillator FOS, 1997.

* cited by examiner

*Primary Examiner* — David Porta
*Assistant Examiner* — Mindy Vu
(74) *Attorney, Agent, or Firm* — Eric A. Gifford (57) ABSTRACT

Stand-offs are attached around the periphery of the fiber optic plate (FOP) to ensure a certain minimum thickness between the FOP and the imaging sensor to reduce shear stress and the risk of delamination due to shear stress in an X or Gamma ray detector. A coupling material fills the gap between the FOP and the imaging sensor.

20 Claims, 7 Drawing Sheets

X OR GAMMA RAY INDIRECT IMAGE DETECTOR WITH FIBER OPTIC PLATE (FOP) STAND-OFFS AND METHOD OF ASSEMBLY

BACKGROUND OF THE INVENTION

Field of the Invention

This invention relates to X or Gamma indirect image detectors that incorporate a fiber optic plate (FOP) to transfer visible light to the imaging sensor, and more particularly to a structure and method of assembling of the FOP to reduce shear stress and the possibility of localized delamination that would produce artifacts in the detected image.

Description of the Related Art

With indirect flat image detectors, the X or Gamma ray radiation penetrates through an object to be examined and encounters a scintillator layer that converts the X or Gamma ray radiation into visible light. If CCD or CMOS imaging sensors are used to detect the light, a fiber optic plate (FOP) is used as an intermediate layer. The FOP allows the converted visible light to pass through but blocks the X or Gamma radiation and thus protects the sensitive sensors. The FOP consists of many individual optical fibers aligned in parallel through which the light is guided. The FOP transfers an image from one end of the fiber to the other without any distortions.

The detector is assembled by forming a coupling layer of adhesive or coupling oil approximately 5 to 100 microns thick on the surface of the imaging sensor and then directly contacting the FOP to that coupling layer. The adhesive or coupling oil may contain small glass spheres that act as spacers. The spheres are intended to provide a defined space, following the macro non-flatness of the FOP and imaging surfaces. The adhesive or coupling oil are suitably index matched to reduce optical distortion and maintain the modulation transfer function (MTF). If the coupling layer is too thick, the optical losses will reduce the MTF.

The coupling layer serves to physically attach the FOP to the imager. This creates shear stress due to TCE (Thermal Coefficient of Expansion) mismatch between the FOP (5-8 ppm/C) and the imaging sensor (approximately 3 ppm/C). The shear stressses may cause localized delamination of the adhesive or coupling oil (air pockets) producing artifacts in the detected image. The coupling oil produces less shear stress but is disfavored as it may contaminate the entire detector and tends to dry out over times.

To maintain the detector's MTF, the thickness of the coupling layer is on the order of the surface flatness of the imaging sensor (e.g. the Silicon). The imaging sensor may have a specified peak-to-valley variation of, for example, 55 microns and the coupling layer may be nominally the same thickness. When the FOP is mounted onto the coupling layer, the layer may be very thin at certain points and the FOP may be in direct contact with the surface of the imaging sensor at its highest peaks. Direct contact of the FOP to the active pixels (imaging area) or amplifier circuitry can damage those components. These points have a higher stress, and thus higher risk of delamination as well. The use of the spherical balls as spacers is typically ineffective as they tend to cluster in the valleys on the surface of the imaging sensor and thus do not effectively space the FOP from the imaging sensor. These clusters also tend to inhibit flow of the adhesive or coupling oil and can produce optical artifacts. The glass spheres may also reduce product life time as they can cause point stresses in the detector.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides for the use of stand-offs around the periphery of the fiber optic plate (FOP) to ensure a certain minimum thickness between the FOP and the imaging sensor to reduce shear stress and the risk of delamination due to shear stress in an X or Gamma ray detector.

This is accomplished by attaching multiple stand-offs around the periphery of the FOP. The stand-offs contact the non-imaging area of the imaging sensor to form a gap that ensures a certain minimum distance between the FOP and the surface of the imaging sensor. A coupling material fills the gap between the FOP and the imaging sensor.

In an embodiment, the stand-offs are attached to the FOP by first applying a film to the underside of the FOP to set the height of the gap. The thickness of the film is selected based on the surface flatness specification of the die that makeup the imaging sensor. The FOP is mounted onto a reference plate that is very flat. The stand-offs are attached around the periphery of the FOP in contact with the surface of the reference plate. The FOP is taken off of the reference plate and the film is removed. The stand-offs extend from the underside of the FOP at a precise and uniform distance set by the thickness of the film. This approach provides uniformity among detectors.

In an embodiment, the stand-offs are attached to the FOP by first applying a film to the underside of the FOP to set the height of the gap. The FOP is mounted onto the imaging sensor. The stand-offs are attached around the periphery of the FOP in contact with non-imaging areas on the surface of the imaging sensor. The FOP is taken off of the imaging sensor and the film is removed. The stand-offs extend from the underside of the FOP by an amount determined by the local "peaks" on the surface of the imaging sensor plus the thickness of the film. The thickness of the film is selected to provide the certain minimum distance between the peaks and the FOP. This approach tailors the stand-offs for each detector.

These and other features and advantages of the invention will be apparent to those skilled in the art from the following detailed description of preferred embodiments, taken together with the accompanying drawings, in which:

DETAILED DESCRIPTION OF THE INVENTION

The present invention provides a structure and method of assembly to ensure a certain minimum thickness of coupling material between the FOP and the imaging sensor to reduce shear stress and the risk of delamination due to shear stress in an X or Gamma ray detector, and does so without introducing spacers or other structure in the optical path that might produce artifacts in the detected image.

The approach is applicable to X or Gamma ray imaging detectors in which an FOP (and conversion layer) is mounted on a visible-band imaging sensor. The conversion layer may be formed as a coating on the topside of the FOP or as a separate "scintillator" that mounted to the FOP. The imaging sensor may be a single or multi-tile configuration in which each tile includes one or more CMOS or CCD die configured to detect visible light. The detector core may be configured with the imaging sensor mounted on the substrate (e.g. PCB, ceramic, stainless steel substrate), mounted side-by-side with a PCB on a tile carrier, or connected via a flex cable to external electronics. The detector core may be housed in a sealed package or an open air package.

Figures 1A, 1B:
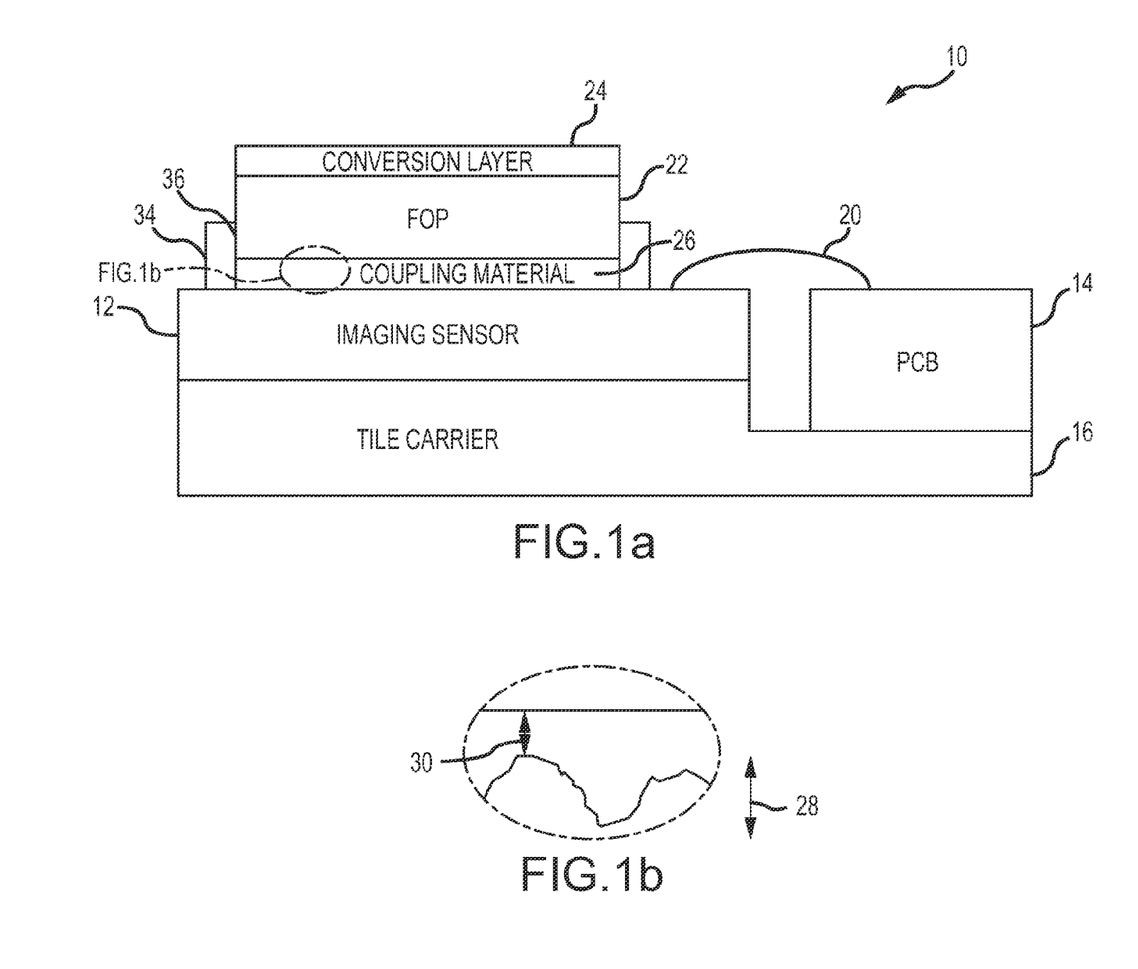
FIGS. 1a through 1c are section and plan views of an embodiment of an X ray detector core incorporating FOP stand-offs.
Figure 1C:
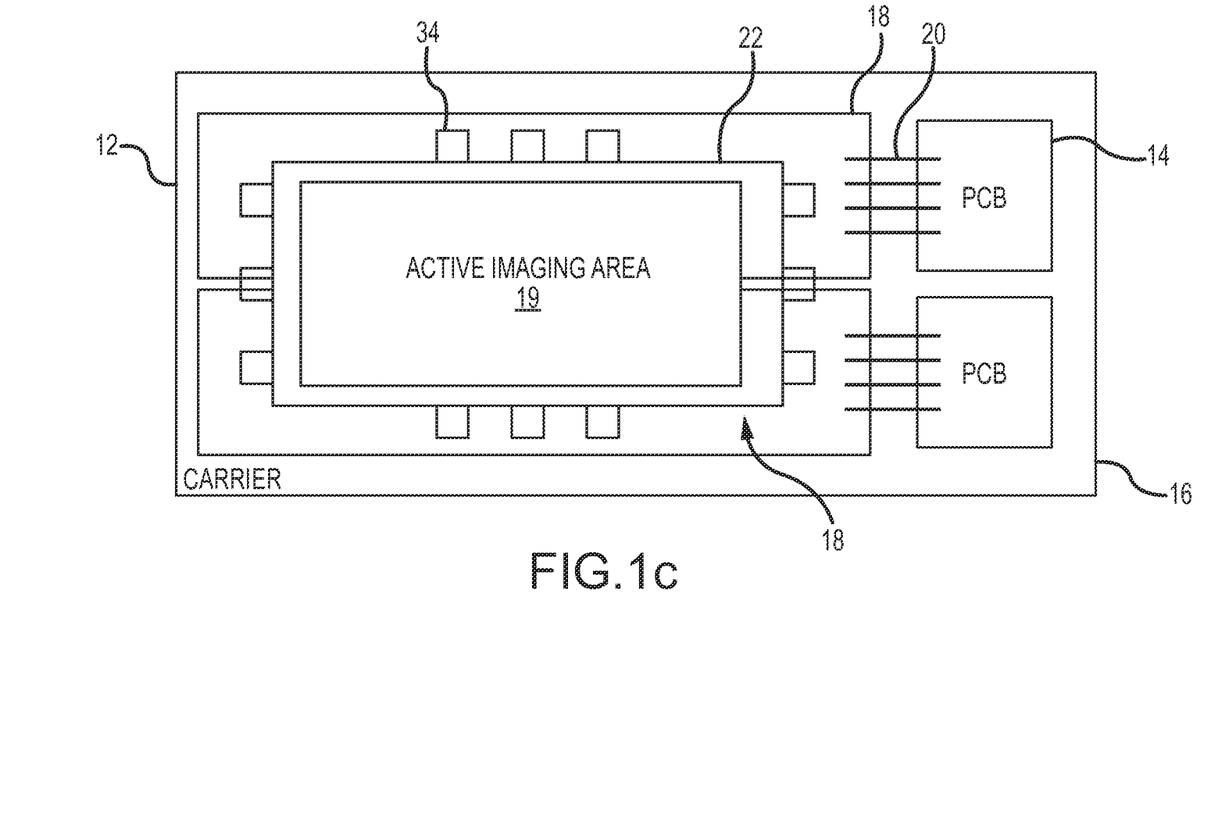

Referring now to FIGS. 1a through 1c, an embodiment of a detector core 10 comprises an imaging sensor 12 mounted side-by-side with a PCB 14 on a tile carrier 16. Imaging sensor 12 includes one or more CMOS or CCD die 18, each die having an imaging area configured to detect visible light and a non-imaging area. Together the dies provide an active imaging area 19 for the image sensor. Tile carrier 16 is stepped to accommodate the different thicknesses of the imaging sensor and PCB so that the two components are approximately co-planar. If the imaging sensor and PCB have the same thickness the carrier does not need to be stepped. Wire bonds 20 are formed between electrical contact pads on the non-imaging area of the die and the PCB.

A FOP 22 and conversion layer 24 are mounted over and optically coupled to the imaging area of imaging sensor 12 using a coupling material 26. Conversion layer 24 may be a coating formed on the topside of FOP 22 or a separate optical component. Coupling material 26 is suitably an index-matched adhesive (UV, thermal or anerobically cured) or a coupling oil. The coupling material is devoid of any spacer material.

The thickness of coupling material 26 is nominally equal to the surface flatness specification 28 of the die plus a certain minimum thickness 30 between the FOP 22 and the surface of the imaging sensor 12 (i.e. peaks 32 on the surface of the die). Surface flatness is specified as the maximum peak-to-valley variation on the surface of the die. Typically, CCD die may have a surface flatness of between 50 and 100 microns. By comparison the surface of the FOP is very flat having a surface flatness of approximately 3-7 microns. The certain minimum thickness 30 may range from 10 to 100 microns to reduce localized sheer stress and the risk of delamination. If the coupling material is too thick the detector's MTF may be degraded. The stand-offs also provide the capability to accurately set the gap and thereby adjust the MTF.

To ensure that the coupling material 26 does provide the certain minimum thickness, a plurality of stand-offs 34 are attached about the periphery 36 of FOP 22 extending out from a bottom surface of the FOP outside the imaging area of the FOP. Stand-offs 34 contact the non-imaging area of the one or more die to form a gap 36 between the FOP and the imaging sensor that is filled by coupling material 26. The stand-offs may or may not be specifically attached to the die. The coupling material tends to adhere the FOP to the imaging sensor. The stand-offs may be formed from glass, silicon, or cyanoacrylates or any other sufficiently rigid material. The number of stand-offs depends on the aspect ratio of the FOP and the size of the stand-offs.

Referring now to FIGS. 2a through 2d, different embodiments for attaching the stand-offs to the FOP use a reference plate to provide uniformity over a class of detectors or use the actual imaging sensor in-situ to tailor the stand-offs to that sensor.

Figure 2A:
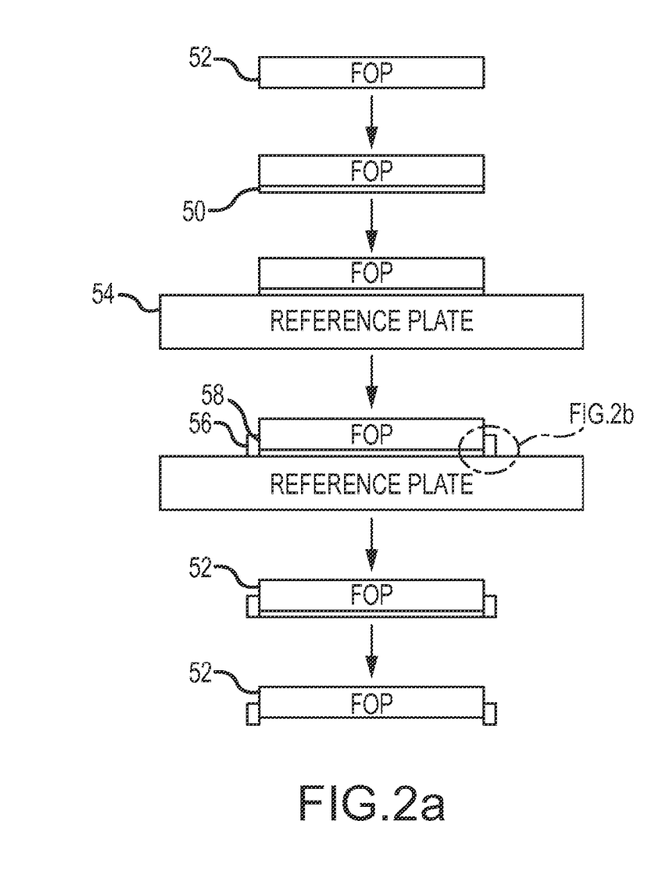
FIGS. 2a through 2d are processing diagrams of different embodiments for placement of the stand-offs around the periphery of the FOP.
Figure 2B:
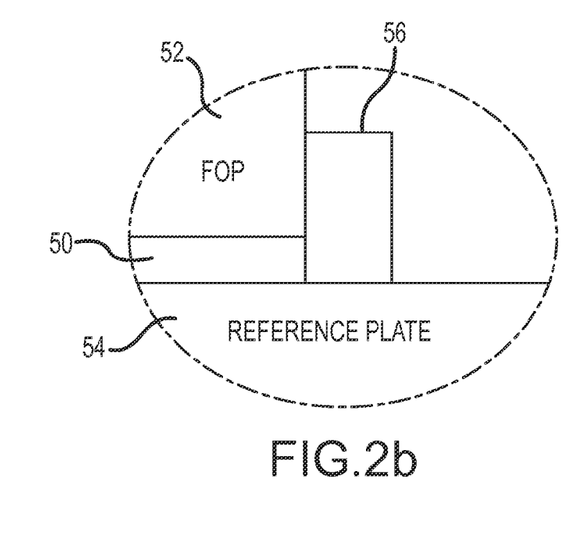

As shown in FIGS. 2a and 2b, an adhesive film 50 is attached to the underside of a FOP 52 and placed on the surface of a reference plate 54. The reference plate has a surface flatness of a few microns, essentially flat as shown in the inset illustration. Adhesive film 50 is selected with a nominal thickness equal to the surface flatness of the die plus the certain minimum thickness. For example, if the dies have a surface flatness of 80 microns and the minimum thickness is 20 microns the film would have a 100 micron thickness. A plurality of stand-offs 56 are attached around the periphery 58 of FOP 52 in contact with the surface of reference plate 54. The reference plate 54 and then the adhesive film 50 are removed, leaving the FOP 52 with stand-offs 56 around the periphery that extend out from the backside of the FOP by a precisely controlled amount.

Figure 2C:
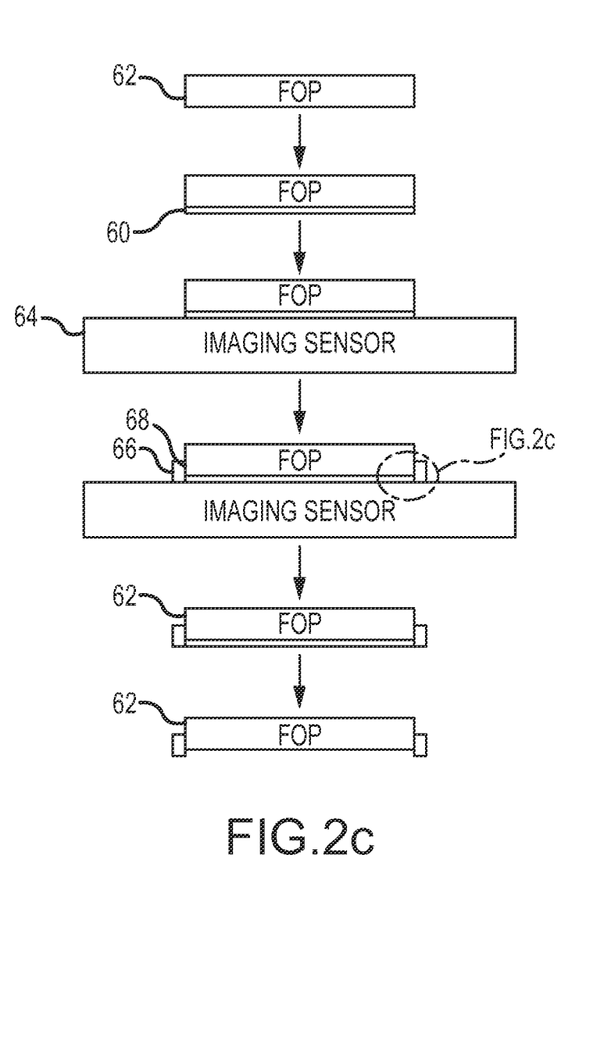
Figure 2D:
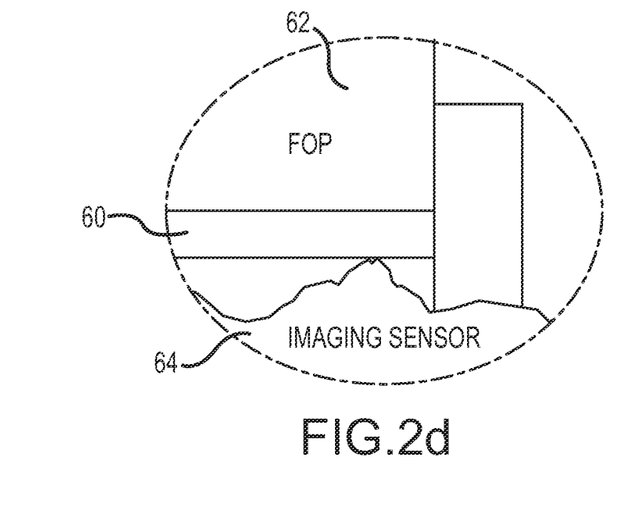

As shown in FIGS. 2c and 2d, an adhesive film 60 is attached to the underside of a FOP 62 and placed on the surface of an imaging sensor 64 that will be packaged together with the FOP. The imaging sensor has a surface flatness of tens of microns as best shown in the inset illustration. Adhesive film 60 is selected with a nominal thickness equal to the certain minimum thickness. A plurality of stand-offs 66 are attached around the periphery 68 of FOP 62 in contact with the non-imaging area on the surface of imaging sensor 64. The imaging sensor 64 and then the adhesive film 60 are removed, leaving the FOP 62 with stand-offs 66 around the periphery that extend out from the backside of the FOP by a precisely controlled amount nominally equal to the surface flatness of the imaging sensor plus the certain minimum thickness.

Figure 3:
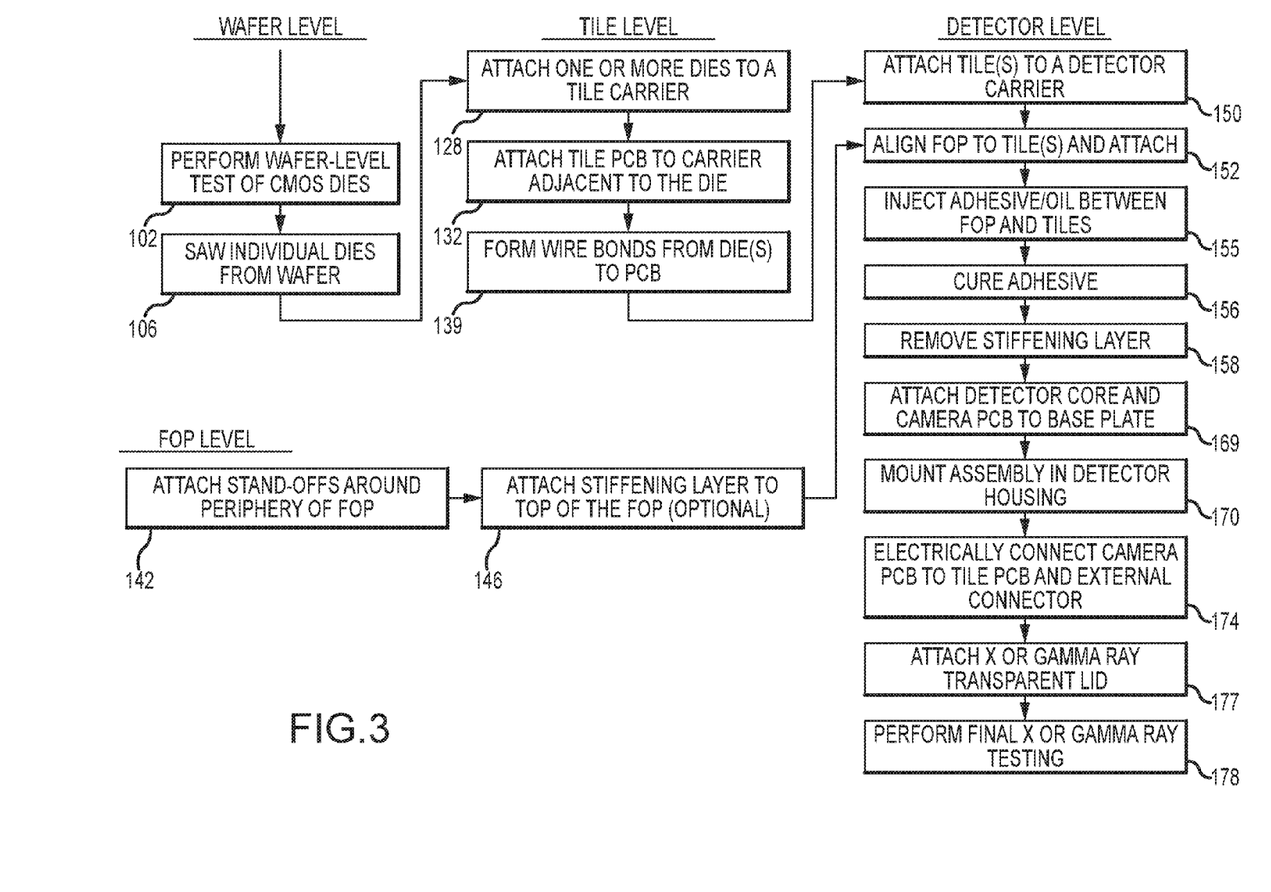
FIG. 3 is a flow diagram for assembly of an embodiment of a multi-tile X-ray detector incorporating FOP stand-offs.
Figure 4A:
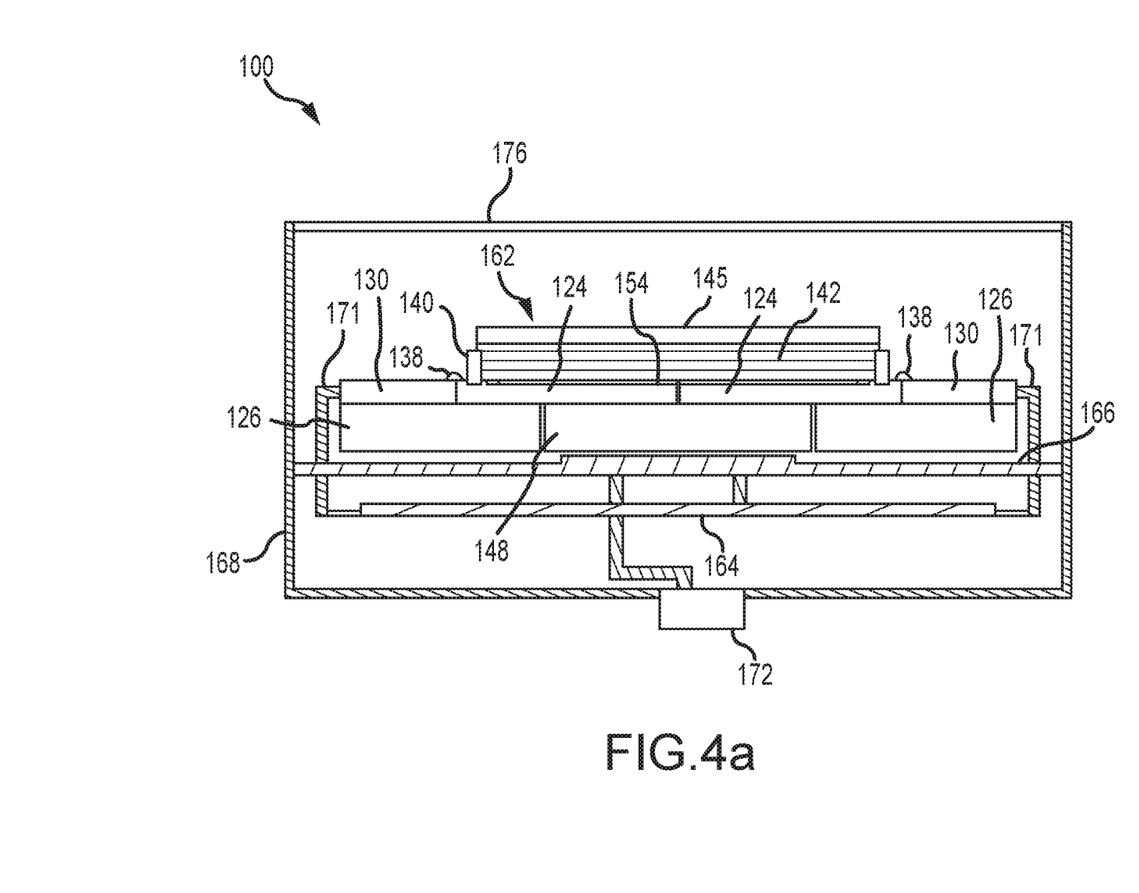
FIGS. 4a and 4b are section and plan views of an embodiment of a multi-tile X ray detector incorporating FOP stand-offs.
Figure 4B:
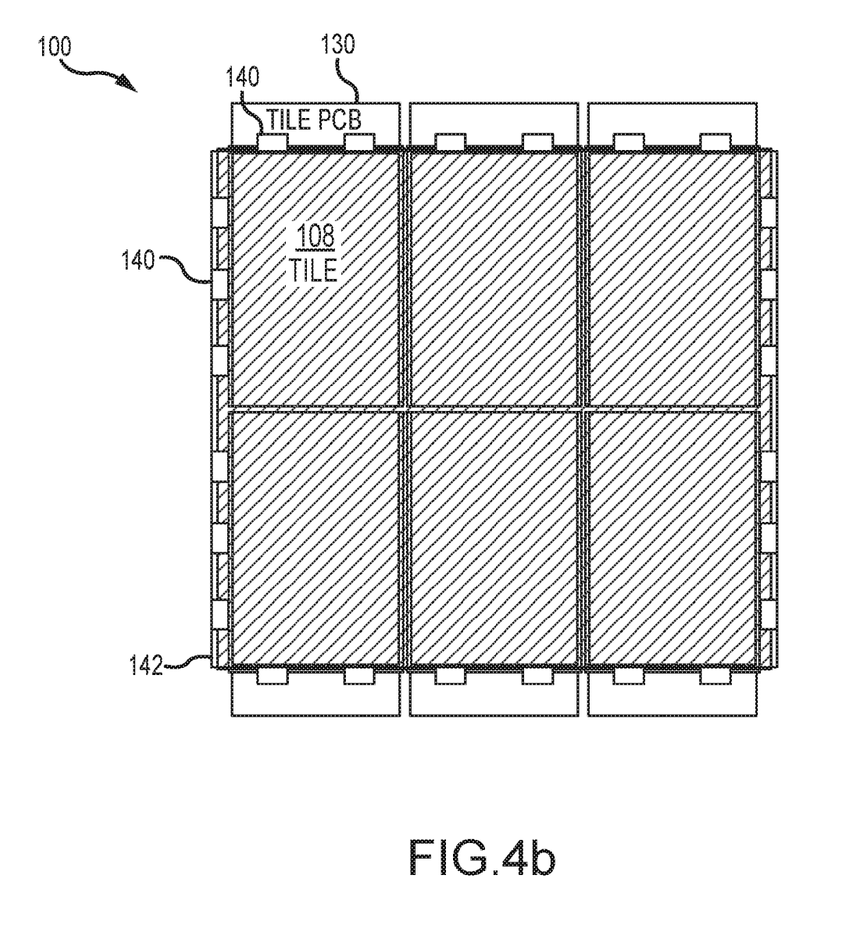

Referring now to FIGS. 3, 4a and 4b, an embodiment of an X-ray imaging detector 100 and a method of assembly are depicted. This embodiment is directed to a multi-tile configuration of CMOS imaging die for X-ray detection. The architecture of the detector, method of assembly and in particular the configuration of the glass cap and method of assembly for protecting the wire bonds is applicable to single-tile configurations, CCD image die and for Gamma ray detection.

Assembly of the imaging detector 100 starts at the Wafer level with the performance of wafer-level testing of the individual CMOS dies (step 102). The individual dies are sawed from the wafer (step 106). Each die has a non-imaging area that includes electrical contact pads and an imaging area configured to detect visible light. In an embodiment, the individual die may be 100 mm×100 mm. The CMOS dies may be fabricated using Silicon or InGaAs technology.

Tile-level assembly of each tile 108 comprises attaching one or more of the individual die that together form an image sensor 124 to a tile carrier 126 (step 128). A tile PCB 130 is attached to tile carrier 126 adjacent image sensor 124 (step 132) forming a trench there between. Tile PCB 130 has a plurality of electrical contact pads that are electrically connected to read out or other processing circuitry for processing the detected image. Wire bonds 138 are formed from the die contact pads to the PCB contact pads spanning trench (step 139). The surfaces of the image sensor 124 and tile PCB 130 are preferably substantially co-planar. Often the tile PCB is thicker than the image sensor in which case the tile carrier 126 would be "stepped" such that the image sensor and tile PCB are coplanar. The tile carrier may, for example, be formed of a Silicon, InGaAs, Kovar or stainless steel material. FOP-level assembly comprises attaching stand-offs 140 around the periphery of a FOP 142 (step 144). Optionally, a stiffening layer may be formed over the conversion layer 145 on FOP 142 (step 146). In a multi-tile configuration the span of the FOP may be large enough that sagging could be a problem. The stiffening layer maintains the overall flatness of the FOP until it can be attached to the imaging sensor and supported by the coupling material.

Detector-level assembly comprises attaching one or more tiles 108 to a detector carrier 148 (step 150). As shown, the exposed backsides of the imaging sensors that extend laterally from the tile carriers are mounted on the top surface of detector carrier 148 to form a multi-tile array in which the tile PCBs are arranged around the periphery of that array. The FOP 142 is aligned and attached to the imaging side of the imaging sensors (step 152). Optionally, the stand-offs 140 may be used as an alignment feature to align the FOP to the imaging sensors. A coupling material 154 is applied between the FOP and tiles to fill the gap (step 155). The coupling material may be a coupling oil or adhesive that can be injected via capillary action between the FOP and tiles. Alternately, the oil or adhesive may first be applied to one or both of the FOP and tiles and then compressed together until the stand-offs contact the non-imaging areas of the imaging sensor. If an adhesive is used, the adhesive is cured (UV, thermal or anerobic) (step 156). If a stiffening layer was used it is removed (step 158). This forms a core detector 162.

The core detector 162 and a camera PCB 164 are suitably mounted to opposite sides of a base plate 166 (step 169). This assembly is mounted in a detector housing 168 (step 170). Alternately the core detector and camera PCB may be directly mounted to the detector housing. The camera PCB 164 is electrically connected to the one or more tile PCBs by, for example, flex connectors 171 and an external connector 172 (step 174). A lid 176 configured to allow transmission of X rays (e.g., a carbon based material) is attached to the detector housing 168 (step 177) to complete X-ray imaging detector 100. Final X ray testing is performed on detector 100 (step 178).

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. An X or Gamma ray detector, comprising:
    a conversion layer configured to convert X or Gamma rays to visible light;
    an imaging sensor comprising one or more CMOS or CCD die, each said die having an imaging area configured to detect visible light and a non-imaging area;
    a fiber optic plate (FOP) positioned between the conversion layer and the imaging sensor, said FOP having top and bottom surfaces separated by a plurality of sides, said FOP configured to transfer visible light onto individual pixels of the die and to block the X or Gamma rays from reaching the die, said FOP comprising a plurality of stand-offs attached to the plurality of sides about the periphery of the FOP and extending below the bottom surface of the FOP, said stand-offs contacting the non-imaging area of said one or more die to form a gap between the FOP and the imaging sensor; and
    a coupling material that fills the gap between the FOP and the imaging sensor.

2. The X or Gamma ray detector of claim 1, wherein said stand-offs are configured to set the gap at a surface flatness of the imaging sensor plus a defined minimum spacing.

3. The X or Gamma ray detector of claim 2, wherein the surface flatness is a surface flatness specification for the imaging sensor.

4. The X or Gamma ray detector of claim 2, wherein the surface flatness is an in-situ surface flatness of the imaging sensor.

5. The X or Gamma ray detector of claim 2, wherein the defined minimum spacing is at least 10 microns.

6. The X or Gamma ray detector of claim 1, wherein the stand-offs are formed from a glass, Silicon, plastic or cyanoacrylate material.

7. The X or Gamma ray detector of claim 1, wherein stand-offs provide an alignment feature for alignment of the FOP to the imaging sensor.

8. The X or Gamma ray detector of claim 1, wherein the coupling material is an adhesive.

9. The X or Gamma ray detector of claim 1, wherein the coupling material is devoid of spacers.

10. A method for assembly of an X or Gamma ray detector, comprising
    providing an imaging sensor comprising one or more CMOS or CCD dies, each said die having an imaging area configured to detect visible light and a non-imaging area;
    providing a fiber optic plate (FOP) and a conversion layer, said conversion layer configured to convert X or Gamma rays to visible light, said FOP having top and bottom surfaces separated by a plurality of sides, said FOP configured to transfer visible light onto individual pixels of the die and to block X or gamma rays from reaching the die;
    attaching a plurality of stand-offs to said plurality of sides around the periphery of the FOP and extending below the bottom surface of the FOP;
    placing the FOP over the imaging sensor such that the stand-offs contact the non-imaging areas of the one or more die to form a gap between the FOP and the imaging sensor; and
    applying a coupling material to fill the gap between the FOP and the imaging sensor.

11. The method of claim 10, wherein said stand-offs are configured to set the gap at a surface flatness of the imaging sensor plus a defined minimum spacing.

12. The method of claim 10, wherein the coupling material is applied to the imaging sensor or the FOP and then the FOP is placed over the imaging sensor to compress the coupling material.

13. The method of claim 10, further comprising using the stand-offs as an alignment feature for alignment of the FOP to the imaging sensor.

14. The method of claim 10, wherein the coupling material is devoid of spacers.

15. A method for assembly of an X or Gamma ray detector, comprising:

providing an imaging sensor comprising one or more CMOS or CCD dies, each said die having an imaging area configured to detect visible light and a non-imaging area;

providing a fiber optic plate (FOP) and a conversion layer, said conversion layer configured to convert X or Gamma rays to visible light, said FOP configured to transfer visible light onto individual pixels of the die and to block X or gamma rays from reaching the die;

forming a plurality of stand-offs around the periphery of the FOP and extending below a bottom surface of the FOP by coating the underside of the FOP with a film having a thickness equal to a surface flatness specification for the imaging sensor plus the defined minimum spacing;

placing the FOP film side down on reference plate;

attaching the plurality of stand-offs around the periphery of the FOP such that they contact the surface of the reference plate; and removing the reference plate and film;

placing the FOP over the imaging sensor such that the stand-offs contact the non-imaging areas of the one or more die to form a gap between the FOP and the imaging sensor; and applying a coupling material to fill the gap between the FOP and the imaging sensor.

16. A method for assembly of an X or Gamma ray detector, comprising:

providing an imaging sensor comprising one or more CMOS or CCD dies, each said die having an imaging area configured to detect visible light and a non-imaging area;

providing a fiber optic plate (FOP) and a conversion layer, said conversion layer configured to convert X or Gamma rays to visible light, said FOP configured to transfer visible light onto individual pixels of the die and to block X or gamma rays from reaching the die;

forming a plurality of stand-offs around the periphery of the FOP and extending below a bottom surface of the FOP by coating the underside of the FOP with a film having a thickness equal to the defined minimum spacing;

placing the FOP film side down on the imaging sensor;

attaching the plurality of stand-offs around the periphery of the FOP such that they contact the surface of the imaging sensor; and removing the imaging sensor and film;

placing the FOP over the imaging sensor such that the stand-offs contact the non-imaging areas of the one or more die to form a gap between the FOP and the imaging sensor; and applying a coupling material to fill the gap between the FOP and the imaging sensor.

17. A method for assembly of an X or Gamma ray detector, comprising:

providing an imaging sensor comprising one or more CMOS or CCD dies, each said die having an imaging area configured to detect visible light and a non-imaging area;

providing a fiber optic plate (FOP) and a conversion layer, said conversion layer configured to convert X or Gamma rays to visible light, said FOP configured to transfer visible light onto individual pixels of the die and to block X or gamma rays from reaching the die;

forming a plurality of stand-offs around the periphery of the FOP and extending below a bottom surface of the FOP;

placing the FOP over the imaging sensor such that the stand-offs contact the non-imaging areas of the one or more die to form a gap between the FOP and the imaging sensor; and injecting a coupling material through capillary flow to fill the gap between the FOP and the imaging sensor.

18. The method of claim 17, wherein a stiffening layer is formed over the FOP and then removed once the coupling material is injected.

19. A fiber optic plate (FOP) assembly for use in an X or Gamma ray detector, said FOP assembly comprising:

a FOP configured to transfer visible light onto individual pixels of an imaging sensor comprising one or more CMOS or CCD die and block the X or Gamma rays from reaching the die, said FOP having top and bottom surfaces separated by a plurality of sides; and a plurality of stand-offs attached to the plurality of sides around the periphery of the FOP and extending below the bottom surface of the FOP.

20. The FOP assembly of claim 19, wherein the stand-offs extend below the bottom surface of the FOP by a stand-off distance equal to a surface flatness of the imaging sensor plus a defined minimum spacing.

* * * * *